US012777407B2

(12) United States Patent
Rosenbluth et al.

(10) Patent No.: US 12,777,407 B2
(45) Date of Patent: Oct. 27, 2026

(54) CHIP-TO-CHIP BANDWIDTH OPTIMIZATION

(71) Applicant: Mellanox Technologies, Ltd., Yokneam (IL)

(72) Inventors: Mark Rosenbluth, Uxbridge, MA (US); Anurag Chaudhary, San Jose, CA (US); Harsh Kumar, San Jose, CA (US); Guan Wang, San Jose, CA (US)

(73) Assignee: Mellanox Technologies, Ltd., Yokneam (IL)

( * ) Notice: Subject to any disclaimer, the term of this patent is extended or adjusted under 35 U.S.C. 154(b) by 309 days.

(21) Appl. No.: 18/375,318

(22) Filed: Sep. 29, 2023

(65) Prior Publication Data

US 2025/0113287 A1 Apr. 3, 2025

(51) Int. Cl.
*H04L 5/00* (2006.01)
*H04W 48/14* (2009.01)

(52) U.S. Cl.
CPC ........... *H04W 48/14* (2013.01); *H04L 5/0053* (2013.01)

(58) Field of Classification Search
CPC ..... H04L 5/00; H04L 1/00; H04L 1/20; H04L 41/08; H04L 47/34; H04L 12/12; H04L 12/80; H04W 48/14; G06F 15/17; G06F 15/78; G06F 13/42; G06F 13/40; G06F 13/14; G06F 13/16; G06F 11/00; G06F 12/08; G06F 12/10; G06F 9/30; G06F 9/46
USPC .......................................................... 370/329
See application file for complete search history.

(56) References Cited

U.S. PATENT DOCUMENTS

| | | | | |
|---|---|---|---|---|
| 9,992,135 | B2 * | 6/2018 | Khare | H04L 49/30 |
| 11,333,703 | B2 * | 5/2022 | Whetsel | G01R 31/3177 |
| 11,637,903 | B2 * | 4/2023 | Rowley | G06F 13/1668 711/112 |
| 11,677,662 | B2 * | 6/2023 | Gray | H04L 45/60 370/401 |
| 12,425,351 | B2 * | 9/2025 | Roozbeh | G06F 13/128 |
| 12,489,085 | B2 * | 12/2025 | Kushnir | H10W 20/20 |
| 2002/0169935 | A1 * | 11/2002 | Krick | G06F 12/0831 711/158 |
| 2017/0177476 | A1 * | 6/2017 | Goren | G06F 12/06 |
| 2021/0109883 | A1 * | 4/2021 | Schulz | G06F 13/385 |
| 2023/0412712 | A1 * | 12/2023 | Suthar | H04L 45/74 |
| 2023/0421473 | A1 * | 12/2023 | Roozbeh | G06F 12/0888 |

(Continued)

*Primary Examiner* — Man U Phan
(74) *Attorney, Agent, or Firm* — Lowenstein Sandler LLP

(57) ABSTRACT

A transceiver for sending and receiving data packets on a communication channel. The transceiver receives a first request packet including a plurality of information fields having a first type of operation to be performed on a memory device and a first address. The transceiver stores the first type of operation and the first address in a memory associated with the transceiver, and sends to a target device, the first request packet with the first address. The transceiver then receives a second request packet, including a second address in the memory device, and determines, based on the first type of operation, the first address, and the second address, that the second request packet is part of a sequence of request packets to the target device. The transceiver then eliminates, in a header of the second request packet, a portion of the second address to form a third request packet and sends the third request packet to the target device.

21 Claims, 6 Drawing Sheets

(56) References Cited

U.S. PATENT DOCUMENTS

2024/0242014 A1* 7/2024 Jeong .................... G06F 30/398
2025/0061078 A1* 2/2025 Chaudhary ......... G06F 13/4031

* cited by examiner

CHIP-TO-CHIP BANDWIDTH OPTIMIZATION

TECHNICAL FIELD

Embodiments of the disclosure relate generally to processors, and more specifically, relate to systems and methods for communicating between two or more devices in a processor.

BACKGROUND

In modern processing units such as GPUs and CPUs, there are various communication protocols and interfaces used to transfer data between different chips or components within the processing unit. Examples of such protocols include peripheral component interconnect express (PCIe) and NVLink®, among others. These communication protocols often involve the use of packets or frames with specific data fields carrying information such as headers, addresses, control bits, and payload data.

Coherent hub interface (CHI) is a communication protocol that is part of the advanced microcontroller bus architecture (AMBA), which is used for communication between two devices or system-on-chips (SoCs) in a GPU. AMBA is an open standard for the connection and management of functional blocks in an SoC. It is used for the development of multi-processor designs with large numbers of controllers and peripherals. CHI can be used in a wide range of applications that require coherency (e.g., ensuring all processors or bus masters in a system see the same view of memory), including mobile, networking, automotive, and data centers. AMBA CHI is designed to maintain performance in systems with a growing number of components and traffic. These systems use multiple components ranging from processor clusters, graphic processors, and memory controllers to I/O bridges, peripheral component interconnect express (PCIe) subsystems, and the interconnect itself. In a multi-chip system such as a system of GPUs, inter-chip communication occurs over chip-to-chip (C2C) input/output (IO) links. However, these IO links take up a significant amount of space and power.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
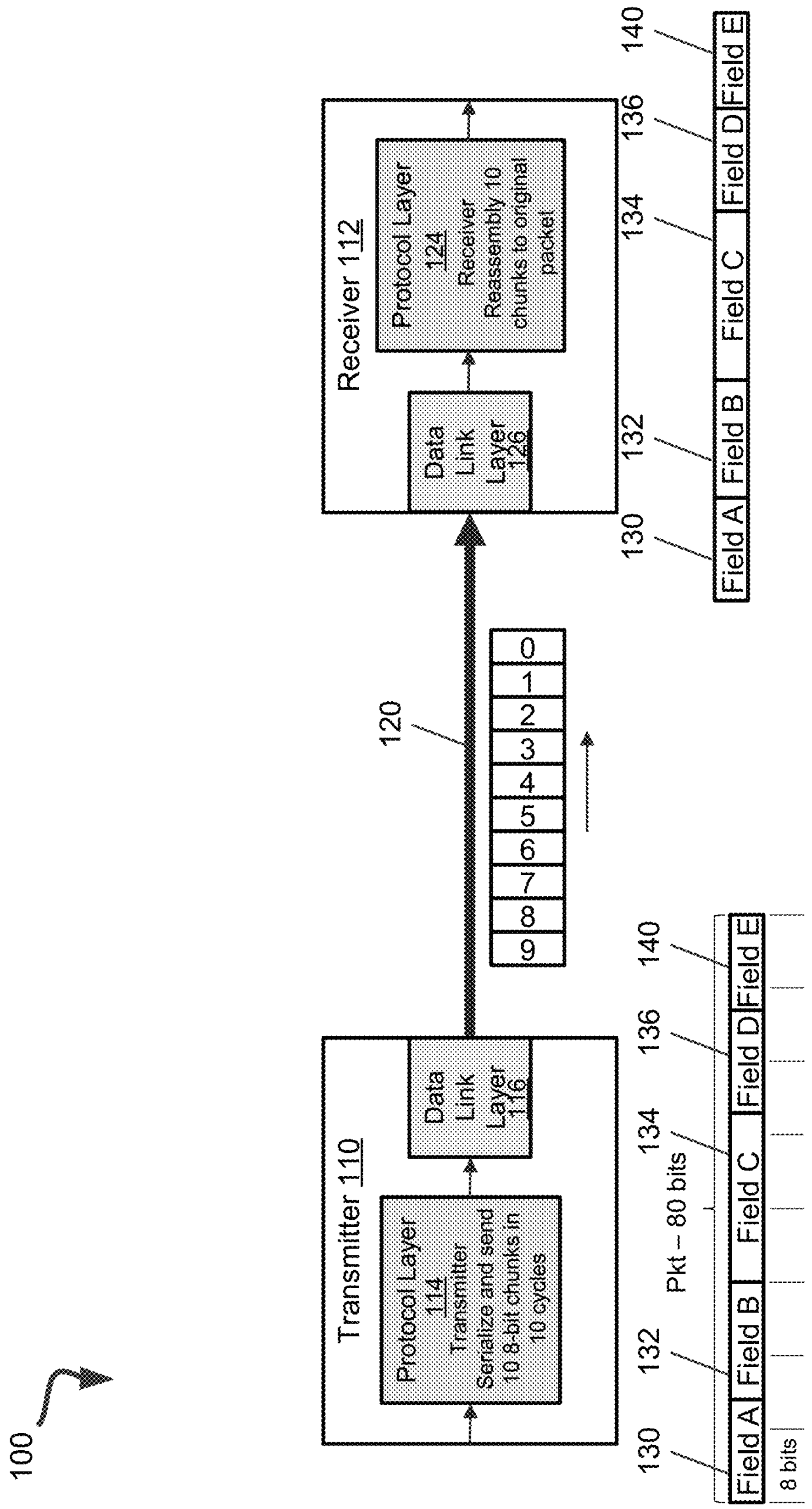
FIG. 1 illustrates an example multi-chip system in accordance with some embodiments of the present disclosure.

Aspects of the present disclosure can address the deficiencies above and other challenges by providing a multi-chip system including two or more system-on-chips (SoCs) connected by an IO link having an optimized bandwidth. The multi-chip system may be a processor (e.g., CPU, GPU, or DPU). In some embodiments, a source device or transmitter receives a request packet to be transmitted to a target device or receiver. The request packet may include one or more information fields, including but not limited to, one or more types of operations to be performed on a memory device, one or more addresses, a size of an operation, one or more ordering requirements, one or more cacheability attributes, etc. Upon receiving the request packet, the source device may identify, based on a type of operation, an address of a target device, and/or a size of operation, that the request packet is part of a series of packets to be transmitted to the target device. In one example, the transmitter may receive a request to read some data from a memory associated with a receiver. Upon receiving such a request, the transmitter may identify that the request packet includes a read operation request and that data from a memory may be read each time to perform and complete the read operation. The transmitter may then store at least some information fields (e.g., address and size) in a memory (e.g., content addressable memory (CAM)) associated with the transmitter, and when a second request packet pertaining to the same operation is received, the transmitter may eliminate a portion of the address or the entire address, and only transmit a portion of the address to the receiver or not send the address at all. Similarly, when a first request packet is received, the receiver may store at least some information fields (e.g., address and size) in a cache memory associated with the receiver, and when a second request packet relating to the same operation is received, the receiver may determine that the only a portion of the address is sent because the remaining portion of the address can be used from a previous or preceding request packet. This way, the redundant or low-value fields may be eliminated, and the bandwidth of the IO link can be saved for other communications.

In some embodiments, the transmitter may be able to anticipate, based on a type of operation and/or a size, the next address to be used and therefore eliminate the address field and/or the size field entirely. For example, if the transmitter receives a request for a write operation of 64 kB, and the write operation is going to be performed in tranches of 8 kB, then the transmitter may be able to anticipate the address of the next memory cell on which the next write operation will be performed. Such information may be redundant as the transmitter and the receiver are already aware, based on a first request packet, as to what operation is being performed, what the size of the operation is, what a beginning address is, and what an end address for the operation might be. In such an instance, the transmitter, including the size of the operation and/or the next address of the memory cell, may be redundant. Accordingly, in some embodiments, the transmitter may entirely eliminate the address and/or size and send the remaining request packet to the receiver. The receiver, which has already stored information from a previous request packet in a cache memory, may be able to determine that a missing address field and/or a missing size field is a request for the receiver to fill in the missing field, based on the information in the previous or preceding request packet.

Advantages of the embodiments in the disclosure include compression of data packets for efficient data communication and lower power consumption. Redundant or low-entropy fields can be compressed to reduce the overall data transfer size, leading to more efficient data transmission and potentially lower power consumption. Other advantages include bandwidth optimization. By identifying and reducing the size of low-entropy fields, more bandwidth can be effectively utilized for transferring useful information, which can result in improved performance of the overall GPU. Other advantages include latency reduction. Smaller data packets resulting from compressing low-entropy fields can lead to reduced communication latency, enhancing the overall responsiveness of the SoC and the overall GPU. The communication protocols disclosed herein may be used in any processing unit (e.g., GPU, DPU, or CPU) including but not limited to Hopper, Grace datacenter/server CPU, and/or NVSwitch for Hopper, and may support link rates of about 212.5 GT/s per lane or more and data transfer rates of 1 TB/s or more.

FIG. 1 illustrates a block diagram of a processor (e.g., GPU, DPU, or CPU) including one or more source devices or transmitters 110 and one or more target devices or receivers 112. Each transmitter 110 and receiver 112 may include a system-on-chip (SoC) or a functional element referred to as a "core." The transmitter 110 and receiver 112 are generally illustrated as system 600, which will be described in further detail with respect to FIG. 6. Transmitter 110 may communicate with receiver 112 over one or more communication layers including but not limited to a protocol layer 114 and a data link layer 116. Similarly, the receiver 112 may communicate with transmitter 110 over one or more communication layers including but not limited to a data link layer 126 and a protocol layer 124. The transmitter 110 and receiver 112 may communicate using one or more communication protocols including but not limited to PCIE and NVlink®. Transmitter 110 and receiver 112 may be coupled, either directly or indirectly, via an ultra-high speed data communication interface such as a C2C IO link 120 over which one or more messages may be sent by transmitter 110 and received by one or more receivers 112. The messages may be sent in the form of "packets," which will be described in further detail below. Under some protocols (e.g., the AMBA-CHI protocol), the transmitter 110 and receiver 112 may send and receive several types of messages including by not limited to a request message, a response message, and a data message. A request message may include a request for performing a specific type of operation. A response message may include an acknowledgment and/or a response including yet another request addressed to the transmitter. A data message may include a payload such as one or more data bits. When a transmitter 110 receives a request packet including 80 bits, the transmitter 110 serializes and sends, over a single 8-bit IO link 120, 8 bits over 10 consecutive cycles, thus resulting in transmitting 80 bits in total. In some implementations, the transmitter may include identifying information to identify the type of packet, for example. In such instances, the 80-bit request, for example, may take 82-bits in total (e.g., 80-bits of the request and 2-bits to identify the type of packet being sent).

Although only two devices are shown for the purposes of illustration, the GPU 100 may include any number of devices, which may be connected using the NVlink® interface. NVLink® is a wire-based communications protocol for near-range semiconductor communications developed by Nvidia that can be used for data and control code transfers in processor systems between CPUs and GPUs, and solely between GPUs. There are several NVlink® protocol layers over which a source device or transmitter 110 and a target device or receiver 112 may communicate with each other. PHY is the physical, electrical layer, which is responsible for driving and receiving analog signals from a device, among other functions. PL is a physical, logical layer (not shown) that includes digital logic that bridges the PHY and the data link layer, among other functions. DL is a data link layer 116, 126, which is responsible for packetization, link reliability, and link configuration, among other functions. TL is a transaction layer 114, 124, which is responsible for protocol bridging and arbitration, providing flow control mechanisms such as spreading traffic across multiple links, maintaining ordering, and other functions.

Generally, a packet sent over a C2C IO link is wider than the IO link itself. Therefore, the packet is sent in multiple parts over the IO link. For example, if the source device or transmitter 110 were to send an 80-bit packet over an 8-bit link 120, then the packet is divided into 10 equal parts, and the parts are sent in 10 consecutive cycles. The receiver 112 reassembles the 10 parts to form the original packet. Each packet includes several information fields 130-140, including but not limited to, packet type, transaction identification (ID), source device ID, target device ID, payload, header cyclic redundancy check (CRC), data CRC, and flow control, among others. A packet type identifies the type of packet being sent, such as data packets, control packets, or acknowledgment packets. In some implementations, the packet type may be separate from the original packet, and identification of the packet type may add some additional bits to the transaction. A transaction ID is used to identify and track different transactions between a transmitter (or source device) and a receiver (or target device). A source device ID and target device ID specify the source and destination of the packet. In NVLink®, each GPU or component on the interconnect is assigned a unique ID to facilitate communication. The payload field carries the actual data being transmitted between the devices. It can include graphics data, compute data, or other information, depending on the purpose of the communication. A header CRC in the packet header ensures data integrity during transmission. CRC allows the receiver to check for errors and verify that the packet arrived without corruption. A data CRC field for the payload data provides an additional layer of data integrity verification. Additionally, flow control mechanisms may be used to manage data flow between the sender and receiver, ensuring data is transmitted at an appropriate rate to prevent data loss or buffer overflow. Some of these information fields are redundant and, therefore, of low value and are generally referred to as "low-entropy" fields. A source device or transmitter 110 may, in some cases, modify or eliminate such low-entropy fields, and the target device or receiver 112 may insert a known default value in place of the missing field.

Figure 2:
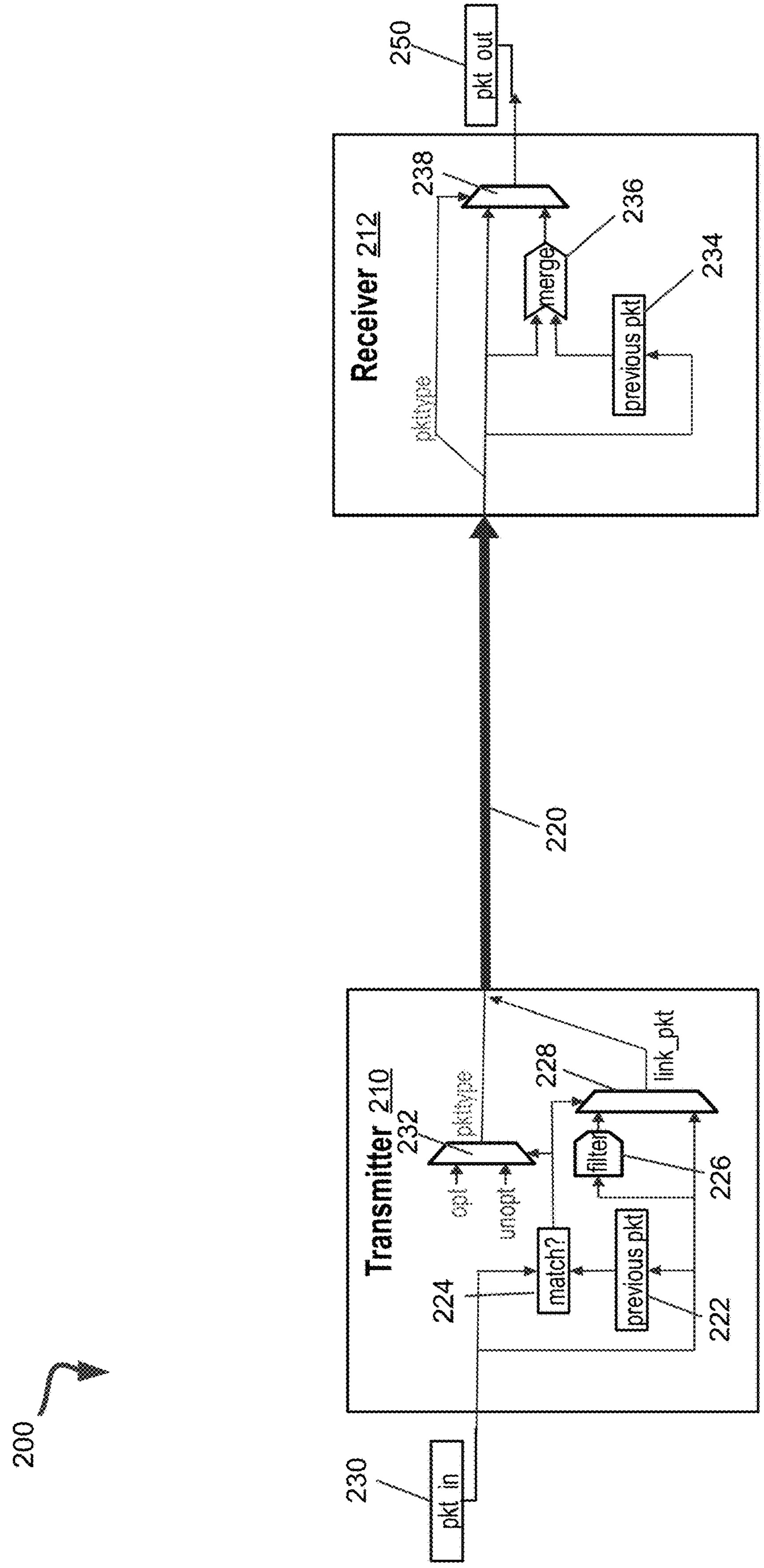
FIG. 2 illustrates an example multi-chip system including an optimized C2C IO link in accordance with some embodiments of the present disclosure.

FIG. 2 illustrates an example an example multi-chip system 200 (e.g., a processor such as a GPU, DPU, or CPU) in accordance with some embodiments of the present disclosure. The multi-chip system 200 may include one or more transmitters 210 and one or more receivers 212. Each of the transmitters 210 and receivers 212 may include a system-on-chip (SoC) or a functional element such as one or more cores. The transmitter 210 and receiver 212 may communicate using one or more communication protocols including but not limited to PCIE and NVlink®. Transmitter 210 and receiver 212 may be coupled, either directly or indirectly, via an ultra-high speed data communication interface such as a C2C IO link 220 over which one or more messages may be sent by transmitter 210 and received by one or more receivers 212. Similarly, the receiver 212 may be the transmitter in some instances where the receiver 212 sends one or more messages to the transmitter 210. Although only two devices are shown for the purposes of illustration, the processor 200 may include any number of devices, which may be connected via the C2C IO link 220, e.g., an NVlink® interface. Although referred to as an IO link, the communication channel between transceiver 210 and receiver 212 may include one or more of a bus, a switch, a network, a crossbar, a daisy chain, and an interconnect fabric.

Under some protocols (e.g., the AMBA-CHI protocol), inter-chip transactions between the transmitter 210 and receiver 212 may involve the use of request packets, response packets, and data messages sent over the IO link 220 to complete a sequence of a protocol. Some transactions may start with a request message 230 that may include many attributes of that request, including but not limited to, the type of operation, the address, size, ordering requirements, cacheability attributes, etc. In some embodiments, the source device or transmitter 210 may eliminate sending low-entropy fields by saving caches of recent requests in the sending and receiving agents. If the transmitter 210 recognizes that a new request uses the same values for those attributes as a request that was recently sent (and therefore cached), it eliminates sending those attributes. Instead, it sends a field designating to the receiver 212 the index of the cache entry that holds that request. Because the receiver's cache has the same recent messages sent by the transmitter 210, the eliminated fields can be recovered from the cache. Therefore, by sending fewer bytes of information over the link 220 per request, more messages can be sent.

Turning again to FIG. 2, transmitter 210 may include one or more multiplexers 228, 232, and one or more filters 226. Transmitter 210 may receive a request packet 230 as part of an IO operation by an IO device (not shown). The request packet 230 may include one or more information fields including but not limited to a type of operation to be performed on a memory device and an address in the memory device. When the transceiver or transmitter 210 receives such a request packet, the transceiver or transmitter 210 may store at least the type of operation and/or the address in a memory (e.g., content addressable memory (CAM)) associated with the transceiver or transmitter 210. The type of operation may include, for example, a read operation, a write operation, and/or a scan operation. In some embodiments, the processing logic of the transmitter 210 may index the type of operation and/or the address in the data structure using a unique process identification (ID). In some embodiments, the processing logic of the transmitter 210 may store such request packet as previous_pkt 222. The transmitter 210 may then send the request packet 230, including the type of operation and/or the address, to a target device or receiver 212. Receiver 212 may include one or more demultiplexers 238 and one or more filters 236. Upon receiving the request packet 230 with the information field pkttype, the receiver 212 may store the request packet 230 (e.g., in a cache memory of the receiver) and the information fields therein as previous_pkt 234. In some embodiments, the storing operation may involve indexing the type of operation and/or the address in a data structure using a unique process identification (ID).

The transmitter 210 may then receive a second request packet 230 from the IO device. The processing logic of the transmitter 210 may then compare the information fields of the second request packet 230 to the information fields of previous_pkt 222, and if there is a match 224 for either the type of operation or a portion of the address, the processing logic may modify the packet type (pkttype) from unoptimized (UNOPT) to optimized (OPT). When the request packet is designated as an optimized packet, the filter 226 may eliminate a portion of the address, and the multiplexer 228 may generate a new request packet (e.g., link_pkt) including only a portion of the address, which is then sent to the receiver 212 over the C2C IO link 220.

In some embodiments, the IO device may access large, sequential regions of a memory. For example, reading a 4 kB region may require 64 reads, each for 64B. The first 64B read to a new 4 kB region would not be found in the cache of the source device or transmitter 210, so the source device or transmitter 210 would then send a non-optimized request with the full address. In response, the upper part of the address is saved into both the transmitter's and receivers' caches. For subsequent accesses that match the upper part of the address, the transmitter does not send the full address but only the lower part. For example, if the first packet has an address of 0x12345000, then the full address is sent, and the upper part of the address (e.g., 0x12345) is saved in the cache memory of both the transmitter 210 and the receiver 212. When a subsequent packet has an address of 0x12345040, the source device or transmitter 210 eliminates the upper part of the address and sends an optimized packet with only 0x040, indicating to the receiver that everything before the 040 can be populated with the default stored value (e.g., 0x12345). This method can be implemented in any transaction that involves a fixed size of memory, and generally most read operations and write operations include a fixed-size operation, as described above.

Upon receiving the optimized packet, the processing logic of the receiver 212 may determine that the optimized packet including an abbreviated address, which can be restored to its original value using a default value stored in the previous packet 234. The processing logic of the receiver would then merge 236 the two portions of the address (e.g., one portion from the optimized packet and one portion from the previous packet 234) to generate a response packet 250 (e.g., pkt_out). The response packet 250 may include an acknowledgment for receiving the request packet 230, and/or it may include an additional request for the transmitter 210. Upon receiving the response packet 250, the transmitter 210 may match, based on a tag field in the response packet, the response packet with the corresponding request packet.

Figure 3:
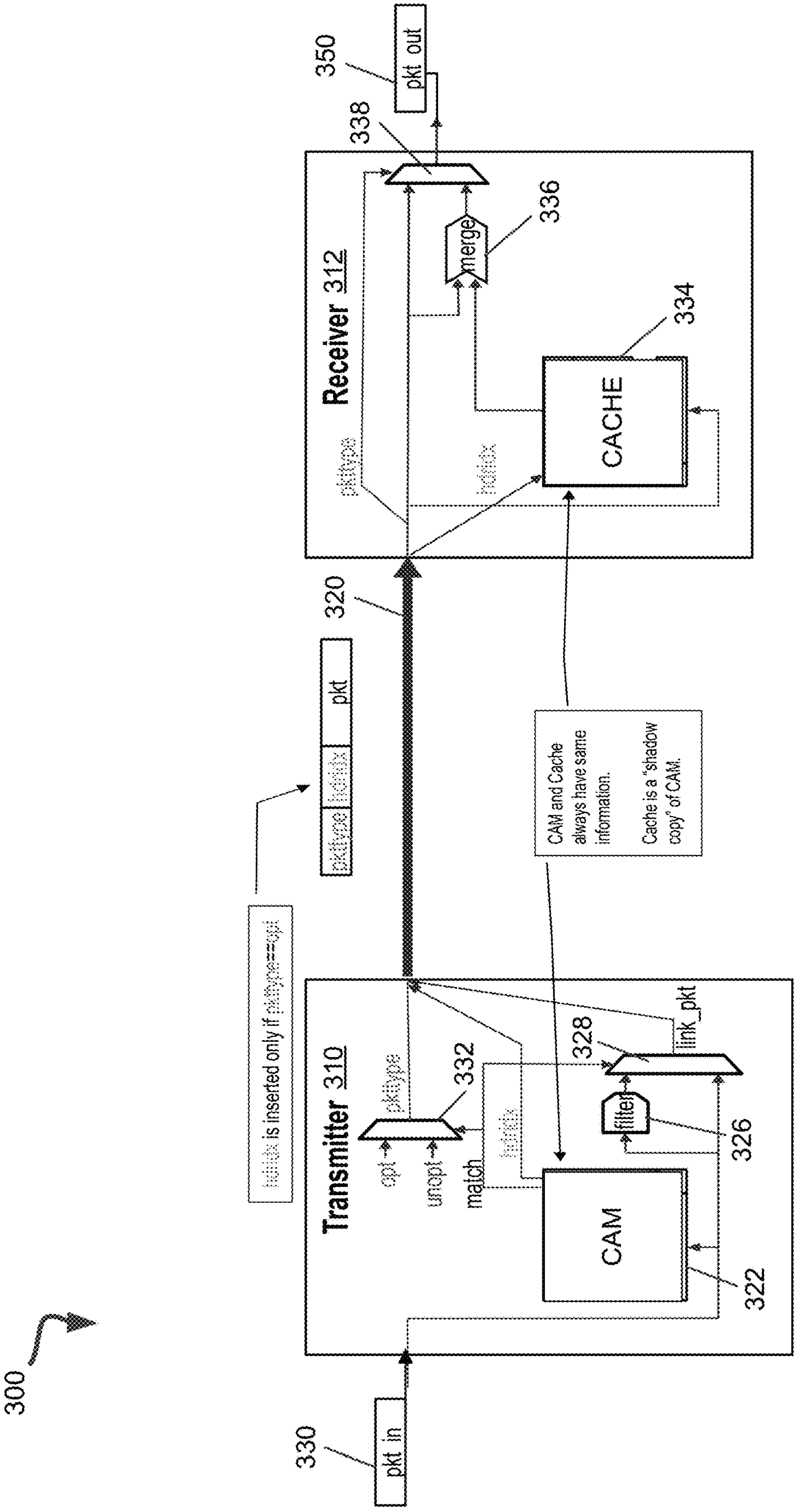
FIG. 3 illustrates an example multi-chip system including an optimized C2C IO link in accordance with some embodiments of the present disclosure.

FIG. 3 illustrates an example multi-chip system 300 including an optimized C2C IO link 320 in accordance with some embodiments of the present disclosure. The multi-chip system 300 may include one or more transmitters 310 and one or more receivers 312. Each of the transmitters 310 and receivers 312 may include a system-on-chip (SoC) or a functional element such as one or more cores. The transmitter 310 and receiver 312 may communicate using one or more communication protocols including but not limited to PCIE and NVlink®. Transmitter 310 and receiver 312 may be coupled, either directly or indirectly, via an ultra-high speed data communication interface such as a C2C IO link 320 over which one or more messages may be sent by transmitter 310 and received by one or more receivers 312. Similarly, the receiver 312 may be the transmitter in some instances where the receiver 312 sends one or more messages to the transmitter 310. Although only two devices are shown for the purposes of illustration, the processor 300 may include any number of devices, which may be connected via the C2C IO link 320, e.g., an Nvlink® interface. Although referred to as an IO link, the communication channel between transceiver 310 and receiver 312 may include one or more of a bus, a switch, a network, a crossbar, a daisy chain, and an interconnect fabric.

A request message 330 may include many attributes of that request, including but not limited to, the type of operation, the address, size, ordering requirements, cacheability attributes, etc. In some embodiments, the source device or transmitter 310 may eliminate sending low-entropy fields by saving caches of recent requests in the sending and receiving agents. If the transmitter 310 recognizes that a new request uses the same values for those attributes as a request recently sent (and therefore cached), it eliminates sending those attributes. Instead, it sends a field designating to the receiver 312 the index of the cache entry that holds that request. Because the receiver's cache has the same recent messages sent by the transmitter 310, the eliminated fields can be recovered from the cache. Therefore, by sending fewer bytes of information over the link 320 per request, more messages can be sent.

In some embodiments, transmitter 310 may include one or more multiplexers 328, 332 and one or more filters 326. Transmitter 310 may receive a request packet 330 as part of an IO operation by an IO device (not shown). The request packet 330 may include one or more information fields including but not limited to a type of operation to be performed on a memory device and an address in the memory device. When the transceiver or transmitter 310 receives such a request packet, the transceiver or transmitter 310 may store at least the type of operation and/or the address in a memory 322 (e.g., content addressable memory (CAM)) associated with the transceiver or transmitter 310. The type of operation may include, for example, a read operation, a write operation, and/or a scan operation. In some embodiments, the processing logic of the transmitter 310 may index the type of operation and/or the address in the data structure using a unique process identification (ID). The transmitter 310 may then send the request packet 330, including the type of operation and/or the address, to a target device or receiver 312. Receiver 312 may include one or more demultiplexers 338 and one or more filters 336. Upon receiving the request packet 330 with the information field pkttype, the receiver 312 may store the request packet 330 (e.g., in a cache memory 334 of the receiver) and the information fields therein. In some embodiments, the storing operation may involve indexing the type of operation and/or the address in a data structure using a unique process identification (ID).

The transmitter 310 may then receive a second request packet 330 from the IO device. The processing logic of the transmitter 310 may then compare the information fields of the second request packet 330 to the information fields of previous_pkt, and if there is a match for either the type of operation or a portion of the address, the processing logic may modify the packet type (pkttype) from unoptimized (UNOPT) to optimized (OPT), and insert a header index (e.g., hdridx). When the request packet is designated as an optimized packet, the filter 326 may eliminate a portion of the address, and the multiplexer 328 may generate a new request packet (e.g., link_pkt) including only a portion of the address, which is then sent to the receiver 312 over the C2C IO link 220.

Upon receiving the optimized packet, the processing logic of the receiver 312 may determine that the optimized packet including an abbreviated address, which can be restored to its original value using the header index. The processing logic of the receiver would then merge 336 the two portions of the address (e.g., one portion from the optimized packet and one portion from the previous packet) to generate a packet 350 (e.g., pkt_out) with the same value as the transmitted packet, however, with the eliminated fields restored. Upon receiving the response packet 350, the transmitter 310 may match, based on a tag field in the response packet, the response packet with the corresponding request packet.

In some embodiments, the transmitter 310 may determine that a request packet is part of a sequence of packets. For example, if the operation being performed is a read operation, then the transmitter 310 is aware that the read operation is performed in a series of operations of a predetermined size (e.g., tranches of a fixed size). Accordingly, the transmitter 310 may determine the next address based on a previous address in a previous packet and store such anticipated address in the CAM 322 of the transmitter 310. Similarly, the receiver 312 may also determine that a request packet is part of a sequence of packets. For example, if the operation being performed is a read operation, then the receiver 312 may be aware that the read operation is performed in a series of operations of a predetermined size (e.g., tranches of a fixed size). Accordingly, the receiver 312 may determine the next address, based on a previous address in a previous packet and store such anticipated address in the cache of the receiver 312. When the transmitter 310 receives a request packet 330 with an anticipated address, the request packet 330 is sent without the anticipated address, and the stored anticipated address is updated to a new anticipated address on both the transmitter side and the receiver side. Consequently, when the receiver 312 receives a request packet without an address field or a size field, the receiver 312 matches the address field with the anticipated address and updates the anticipated address to a new anticipated address.

For example, instead of saving the upper address in the cache, the full address, as adjusted by the size, is saved in the cache. The address that is cached is based on the current address plus the size, anticipating that the IO device will access that cached address next. For example, if the initial packet has an address 0x12345000, then the full address is sent to the receiver, and both the receiver and the transmitter save the full address plus the size (e.g., 0x12345040) in the cache. When a subsequent packet has an address of 0x12345040, the entire address field is eliminated, and the packet is sent without an address or a size field, and the cache on both the transceiver side and the receiver side is updated to hold a new address plus size (e.g., 0x12345080 (previous address+size)). Consequently, when the next packet has an address of 0x12345080, neither the address nor the size of the transaction is sent to the receiver, and the receiver can decode, based on the cached address and size, that the new address is 0x12345080. This method can be implemented in any transaction that involves a fixed size of memory, and generally most read operations and write operations include a fixed-size operation, as described above. Advantages of the disclosed embodiments are that when the addresses are sequential (which is likely for IO accesses), the full address field can be eliminated. This saves several bytes for every packet transmitted. Compared with the current optimization methods, more redundant information is eliminated from being sent over the C2C link. This results in the devices being able to send more messages using the same bandwidth. An estimate is that an unoptimized request would use 17 bytes, and the present optimization method reduces that request to 7 bytes, which results in a saving of about 60% of the bandwidth.

Figure 4:
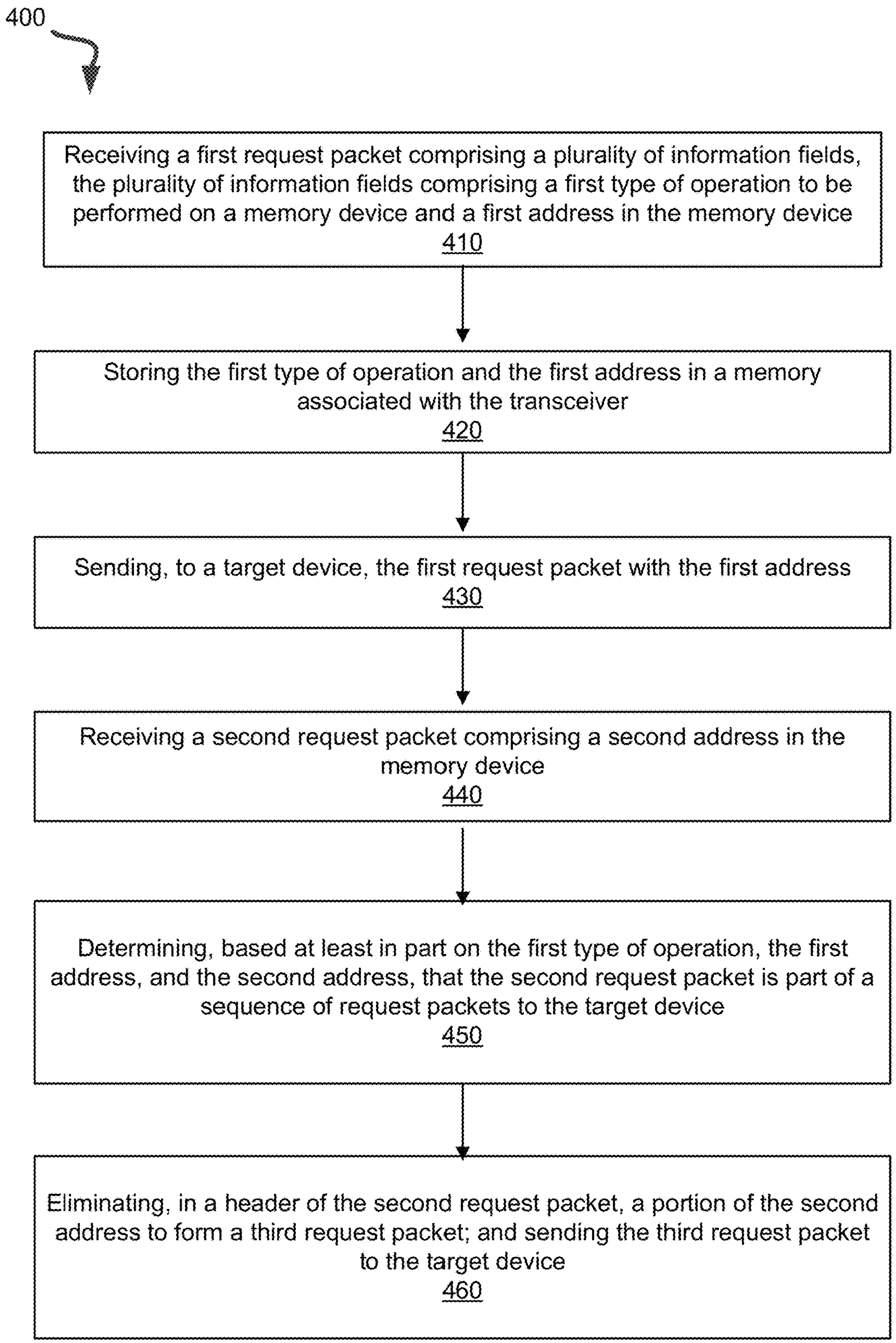
FIG. 4 illustrates example operations in a method for optimizing bandwidth on a C2C IO link in accordance with some embodiments of the present disclosure.

FIG. 4 illustrates example operations in a method 400 for optimizing C2C IO link in a multi-chip system in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Aspects of the present disclosure can be applied to a multi-chip system including an array of functional units (referred to as "tiles" or "cores") connected via a C2C IO link. A first functional unit (e.g., a source device) in the array of functional units includes a memory device and a processing device, operatively coupled with the memory device, to perform a series of operations. At operation 410, the source device may receive a request packet as part of an IO operation by an IO device. The request packet may include one or more information fields including but not limited to a type of operation to be performed on a memory device and an address in the memory device. At operation 420, the source device may store at least the type of operation and/or the address in a memory (e.g., content addressable memory (CAM)) associated with the source device. The type of operation may include, for example, a read operation, a write operation, and/or a scan operation. In some embodiments, the processing logic of the source device may index the type of operation and/or the address in the data structure using a unique process identification (ID).

At operation 430, the processing logic of the source device may send the request packet, including the type of operation and/or the address, to a target device. Upon receiving the request packet with the information field pkttype, the target device may store the request packet (e.g., in a cache memory of the receiver) and the information fields therein. In some embodiments, the storing operation may involve indexing the type of operation and/or the address in a data structure using a unique process identification (ID).

At operation 440, the source device may receive a second request packet from the IO device. At operation 450, the processing logic of the source device may then compare the information fields of the second request packet to the information fields of previous_pkt, and if there is a match for either the type of operation or a portion of the address, the processing logic may modify the packet type (pkttype) from unoptimized (UNOPT) to optimized (OPT).

At operation 460, when the request packet is designated as an optimized packet, the source device may eliminate a portion of the address, and the source device may generate a new request packet (e.g., link_pkt) including only a portion of the address, which is then sent to the target device over the C2C IO link.

In some embodiments, the IO device may access large, sequential regions of a memory. For example, reading a 4 kB region may require 64 reads, each for 64B. The first 64B read to a new 4 kB region would not be found in the cache of the source device, so the source device would then send a non-optimized request with the full address. In response, the upper part of the address is saved into both the transmitter's and receiver's caches. For subsequent accesses that match the upper part of the address, the transmitter does not send the full address but only the lower part. For example, if the first packet has an address of 0x12345000, then the full address is sent, and the upper part of the address (e.g., 0x12345) is saved in the cache memory of both the source device and the target device. When a subsequent packet has an address of 0x12345040, the source device eliminates the upper part of the address and sends an optimized packet with only 0x040, indicating to the receiver that everything before the 040 can be populated with the default stored value (e.g., 0x12345).

Upon receiving the optimized packet, the processing logic of the target device may determine that the optimized packet including an abbreviated address, which can be restored to its original value using a default value stored in the previous packet. The processing logic of the receiver would then merge the two portions of the address (e.g., one portion from the optimized packet and one portion from the previous packet) to generate a response packet (e.g., pkt_out). The response packet may include an acknowledgment for receiving the request packet, and/or it may include an additional request for the transmitter. Upon receiving the response packet, the source device may match, based on a tag field in the response packet, the response packet with the corresponding request packet.

Figure 5:
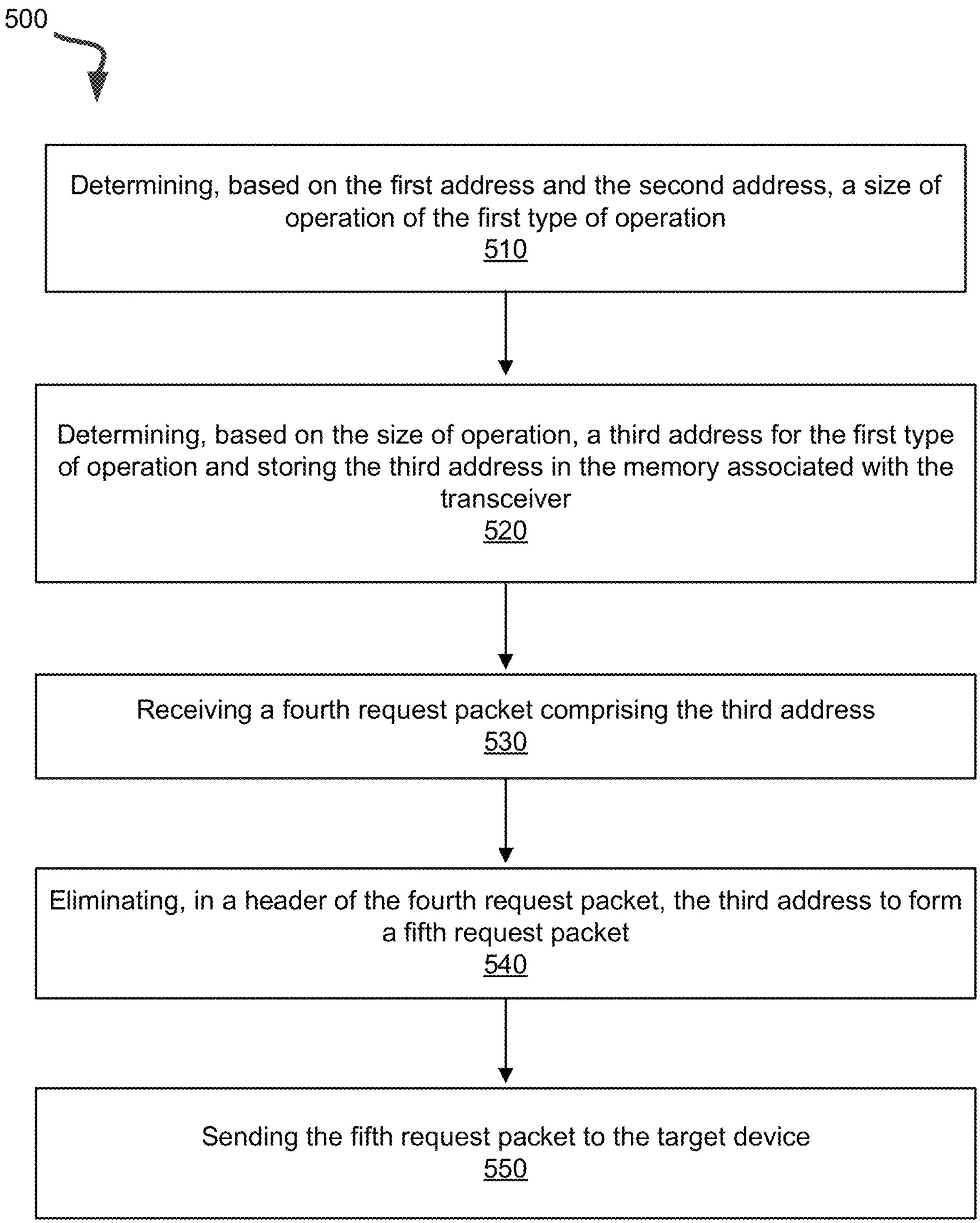
FIG. 5 illustrates example operations in a method for optimizing bandwidth on a C2C IO link in accordance with some embodiments of the present disclosure.

FIG. 5 illustrates example operations in a method 500 for optimizing C2C IO link in a multi-chip system in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the source device may receive a request packet as part of an IO operation by an IO device. The request packet may include one or more information fields including but not limited to a type of operation to be performed on a memory device and an address in the memory device. When the source device receives such a request packet, the source device may store at least the type of operation and/or the address in a memory (e.g., content addressable memory (CAM)) associated with the source device. The type of operation may include, for example, a read operation, a write operation, and/or a scan operation. In some embodiments, the processing logic of the source device may index the type of operation and/or the address in the data structure using a unique process identification (ID). The source device may then send the request packet, including the type of operation and/or the address, to a target device. Upon receiving the request packet with the information field pkttype, the target device may store the request packet (e.g., in a cache memory of the receiver) and the information fields therein. In some embodiments, the storing operation may involve indexing the type of operation and/or the address in a data structure using a unique process identification (ID).

The source device may then receive a second request packet from the IO device. The processing logic of the transmitter may then compare the information fields of the second request packet to the information fields of previous_pkt, and if there is a match for either the type of operation or a portion of the address, the processing logic may modify the packet type (pkttype) from unoptimized (UNOPT) to optimized (OPT), and insert a header index (e.g., hdridx). When the request packet is designated as an optimized packet, the source device may eliminate a portion of the address, and the source device may generate a new request packet (e.g., link_pkt) including only a portion of the address, which is then sent to the target device over the C2C IO link. Upon receiving the optimized packet, the processing logic of the target device may determine that the optimized packet including an abbreviated address, which can be restored to its original value using the header index. The processing logic of the receiver would then merge the two portions of the address (e.g., one portion from the optimized packet and one portion from the previous packet) to generate a response packet (e.g., pkt_out). The response packet may include an acknowledgment for receiving the request packet, and/or it may include an additional request for the transmitter. Upon receiving the response packet, the source device may match, based on a tag field in the response packet, the response packet with the corresponding request packet.

At operation 520, the source device may determine that a request packet is part of a sequence of packets. For example, if the operation being performed is a read operation, then the source device may be aware that the read operation is performed in a series of operations of a predetermined size (e.g., tranches of a fixed size). Accordingly, the source device may determine the next address, based on a previous address in a previous packet and store such anticipated address in the CAM of the source device. Similarly, the target device may also determine that a request packet is part of a sequence of packets. For example, if the operation being performed is a read operation, then the target device may be aware that the read operation is performed in a series of operations of a predetermined size (e.g., tranches of a fixed size). Accordingly, the target device may determine the next address, based on a previous address in a previous packet and store such anticipated address in the cache of the target device.

At operation 530, the source device may receive a request packet with an anticipated address, and, at operation 540, the request packet is sent without the anticipated address, and the stored anticipated address is updated to a new anticipated address on both the transmitter side and the receiver side. Consequently, at operation 550, when the target device receives a request packet without an address field or a size field, the target device matches the address field with the anticipated address and updates the anticipated address to a new anticipated address.

For example, instead of saving the upper address in the cache, the full address, as adjusted by the size, is saved in the cache. The address that is cached is based on the current address plus the size, anticipating that the IO device will access that cached address next. For example, if the initial packet has an address 0x12345000, then the full address is sent to the receiver, and both the receiver and the transmitter save the full address plus the size (e.g., 0x12345040) in the cache. When a subsequent packet has an address of 0x12345040, the entire address field is eliminated, and the packet is sent without an address or a size field, and the cache on both the transceiver side and the receiver side is updated to hold a new address plus size (e.g., 0x12345080 (previous address+size)). Consequently, when the next packet has an address of 0x12345080, neither the address nor the size of the transaction is sent to the receiver, and the receiver can decode, based on the cached address and size, that the new address is 0x12345080.

Advantages of the embodiments in the disclosure include compression of data packets for efficient data communication and lower power consumption. Redundant or low-entropy fields can be compressed to reduce the overall data transfer size, leading to more efficient data transmission and potentially lower power consumption. Other advantages include bandwidth optimization. By identifying and reducing the size of low-entropy fields, more bandwidth can be effectively utilized for transferring useful information, which can result in improved performance of the overall GPU. Other advantages include latency reduction. Smaller data packets resulting from compressing low-entropy fields can lead to reduced communication latency, enhancing the overall responsiveness of the SoC and the overall GPU. The communication protocols disclosed herein may be used in any GPU design including but not limited to Hopper, Grace datacenter/server CPU, and/or NVSwitch for Hopper, and may support link rates of about 212.5 GT/s per lane or more and data transfer rates of 1 TB/s or more.

Figure 6:
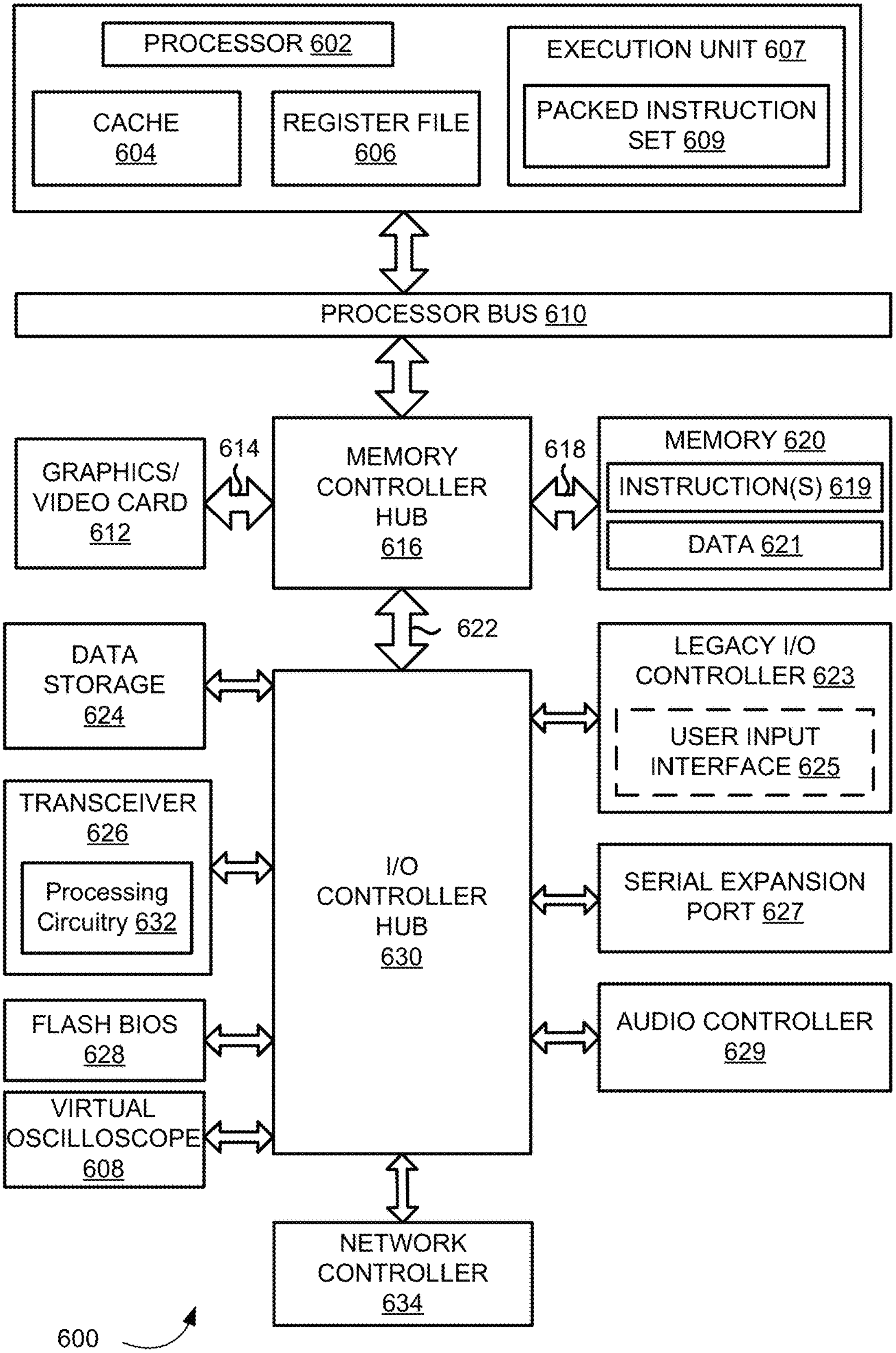
FIG. 6 illustrates an example computer system including a multi-tile system, in accordance with some embodiments of the present disclosure.

FIG. 6 illustrates a computer system 600 including a multi-chip system, in accordance with at least one embodiment. In at least one embodiment, computer system 600 may be a system with interconnected devices and components, an SOC, or some combination. In at least one embodiment, computer system 600 is formed with a processor 602 that may include execution units to execute an instruction. In at least one embodiment, computer system 600 may include, without limitation, a component, such as processor 602, to employ execution units including logic to perform algorithms for processing data. In at least one embodiment, computer system 600 may include processors, such as PENTIUM® Processor family, Xeon®, Itanium®, XScale® and/or StrongARM®, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 600 may execute a version of the Windows® operating system available from Microsoft Corporation of Redmond, WA, although other operating systems (UNIX and Linux, for example), embedded software, and/or graphical user interfaces, may also be used.

In at least one embodiment, computer system 600 may be used in other devices, such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 600 may be used in devices such as graphics processing units (GPUs), network adapters, central processing units, and network devices such as switches (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 600 may include, without limitation, processor 602 that may include, without limitation, one or more execution units 607 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 600 is a single-processor desktop or server system. In at least one embodiment, computer system 600 may be a multiprocessor system. In at least one embodiment, processor 602 may include, without limitation, a CISC microprocessor, a RISC microprocessor, a VLIW microprocessor, a processor implementing a combination of instruction sets, or any other processor device, such as a digital signal processor, for example. In at least one embodiment, processor 602 may be coupled to a processor bus 610 that may transmit data signals between processor 602 and other components in computer system 600.

In at least one embodiment, processor 602 may include, without limitation, a Level 1 ("L1") internal cache memory ("cache") 604. In at least one embodiment, processor 602 may have a single internal cache or multiple levels of internal cache. In at least one embodiment, cache memory may reside external to processor 602. In at least one embodiment, processor 602 may also include a combination of both internal and external caches. In at least one embodiment, a register file 606 may store different types of data in various registers including, without limitation, integer registers, floating point registers, status registers, and instruction pointer registers.

In at least one embodiment, execution unit 607, including, without limitation, logic to perform integer and floating point operations, also resides in processor 602. Processor 602 may also include a microcode ("ucode") read-only memory ("ROM") that stores microcode for certain macro instructions. In at least one embodiment, execution unit 607 may include logic to handle a packed instruction set 609. In at least one embodiment, by including packed instruction set 609 in an instruction set of a general-purpose processor 602, along with associated circuitry to execute instructions, operations used by many multimedia applications may be performed using packed data in a general-purpose processor 602. In at least one embodiment, many multimedia applications may be accelerated and executed more efficiently by using the full width of a processor's data bus for performing operations on packed data, which may eliminate the need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 600 may include, without limitation, a memory 620. In at least one embodiment, memory 620 may be implemented as a DRAM device, an SRAM device, a flash memory device, or other memory devices. Memory 620 may store instruction(s) 619 and/or data 621 represented by data signals that may be executed by processor 602.

In at least one embodiment, a system logic chip may be coupled to processor bus 610 and memory 620. In at least one embodiment, the system logic chip may include, without limitation, a memory controller hub ("MCH") 616, and processor 602 may communicate with MCH 616 via processor bus 610. In at least one embodiment, MCH 616 may provide a high bandwidth memory path 618 to memory 620 for instruction and data storage and storage of graphics commands, data, and textures. In at least one embodiment, MCH 616 may direct data signals between processor 602, memory 620, and other components in computer system 600 and to bridge data signals between processor bus 610, memory 620, and a system I/O 622. In at least one embodiment, a system logic chip may provide a graphics port for coupling to a graphics controller. In at least one embodiment, MCH 616 may be coupled to memory 620 through high bandwidth memory path 618, and graphics/video card 612 may be coupled to MCH 616 through an Accelerated Graphics Port ("AGP") interconnect 614.

In at least one embodiment, computer system 600 may use system I/O 622, which is a proprietary hub interface bus to couple MCH 616 to I/O controller hub ("ICH") 630. In at least one embodiment, ICH 630 may provide direct connections to some I/O devices via a local I/O bus. In at least one embodiment, a local I/O bus may include, without limitation, a high-speed I/O bus for connecting peripherals to memory 620, a chipset, and processor 602. Examples may include, without limitation, an audio controller 629, a firmware hub ("flash BIOS") 628, a transceiver 626, a data storage 624, a legacy I/O controller 623 containing a user input interface 625 and a keyboard interface, a serial expansion port 627, such as a USB, and a network controller 634. Data storage 624 may include a hard disk drive, a floppy disk drive, a CD-ROM device, a flash memory device, or other mass storage devices. In an embodiment, the transceiver 626 includes a constrained FFE 608.

In at least one embodiment, FIG. 6 illustrates a system, which includes interconnected hardware devices or "chips" in the transceiver 626—e.g., the transceiver 626 includes a chip-to-chip interconnect including the source device or transmitter 110, 210, 310 and target device or receiver 112, 212, 312 as described with reference to FIGS. 1-3). In at least one embodiment, FIG. 6 may illustrate an exemplary SoC. In at least one embodiment, devices illustrated in FIG. 6 may be interconnected with proprietary interconnects, standardized interconnects (e.g., PCIe), NVlink®, or some combination thereof. In at least one embodiment, one or more components of system 600 are interconnected using compute express link ("CXL") interconnects. In an embodiment, the transceiver 626 can include processing circuitry as described with reference to FIGS. 1-3. In such embodiments, the processing circuitry can facilitate a method for providing a multi-chip system, as described herein.

Other variations are within the spirit of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but it can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media, and one or more of individual non-transitory storage media of multiple non-transitory computer-readable storage media lacks all of the code, while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "receiving," "providing," "obtaining," "using," or like, refer to actions and/or processes of a computer or computing system, or similar electronic computing device, that manipulates and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or parallel, continuously or intermittently. In at least one embodiment, the terms "system" and "method" are used herein interchangeably insofar as the system may embody one or more methods, and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that the subject matter claimed in appended claims is not necessarily limited to specific features or acts described. Rather, specific features and acts are disclosed as exemplary forms of implementing the claims.

What is claimed is:

1. A transceiver for sending and receiving data packets on a communication channel, the transceiver is to perform operations comprising:

receiving a first request packet comprising a plurality of information fields, the plurality of information fields comprising a first type of operation to be performed on a memory device and a first address in the memory device;

storing the first type of operation and at least a portion of the first address in a memory associated with the transceiver;

sending, to a target device, the first request packet with the first address;

receiving a second request packet comprising a second address in the memory device;

determining, based at least in part on the first type of operation, the first address, and the second address, that the second request packet is part of a sequence of request packets to the target device, wherein determining that the second request packet is part of the sequence comprises:

comparing the first address in the first request packet to the second address in the second request packet, wherein the first request packet precedes the second request packet; and determining the first address and the second address are in a sequence of addresses;

eliminating, in a header of the second request packet, at least a portion of the second address to form a third request packet based on determining that the second request packet is part of the sequence; and sending the third request packet to the target device.

2. The transceiver of claim 1, wherein the determining further comprises:

comparing the first type of operation of the first request packet to a second type of operation of the second request packet, wherein the first request packet precedes the second request packet; and determining a match between the first type of operation of the first request packet and the second type of operation of the second request packet.

3. The transceiver of claim 1, wherein the operations further comprise:

determining, based on the first address and the second address, a size of operation of the first type of operation;

determining, based on the size of operation, a third address for the first type of operation and storing the third address in the memory associated with the transceiver;

receiving a fourth request packet comprising the third address;

eliminating, in a header of the fourth request packet, the third address to form a fifth request packet; and sending the fifth request packet to the target device.

4. The transceiver of claim 1, wherein the communication channel comprises at least one of a bus, a switch, a network, a crossbar, a daisy chain, or an interconnect fabric.

5. The transceiver of claim 1, wherein the operations further comprise:

receiving a response packet in response to the third request packet; and matching, based on a tag field in the response packet, the response packet with the third request packet.

6. The transceiver of claim 1, wherein the first type of operation comprises at least one of a read operation, a write operation, or a scan operation.

7. The transceiver of claim 1, wherein the storing further comprises storing the first type of operation and the first address in a data structure in a content addressable memory (CAM) associated with the transceiver.

8. The transceiver of claim 7, wherein the operations further comprise:

indexing the first type of operation in the data structure using a unique process identification (ID).

9. A method, comprising:

receiving, by a source device, a first request packet comprising a plurality of information fields, the plurality of information fields comprising a first type of operation to be performed on a memory device and a first address in the memory device;

storing the first type of operation and at least a portion of the first address in a memory associated with the source device;

sending, to a target device, the first request packet with the first address;

receiving a second request packet comprising a second address in the memory device;

determining, based at least in part on the first type of operation, the first address, and the second address, that the second request packet is part of a sequence of request packets to the target device, wherein determining that the second request packet is part of the sequence comprises:

comparing the first address in the first request packet to the second address in the second request packet, wherein the first request packet precedes the second request packet; and determining the first address and the second address are in a sequence of addresses;

eliminating, in a header of the second request packet, at least a portion of the second address to form a third request packet based on determining that the second request packet is part of the sequence; and sending, by the source device, the third request packet to the target device.

10. The method of claim 9, wherein the determining further comprises:

comparing the first type of operation of the first request packet to a second type of operation of the second request packet, wherein the first request packet precedes the second request packet; and determining a match between the first type of operation of the first request packet and the second type of operation of the second request packet.

11. The method of claim 9, further comprising:

determining, based on the first address and the second address, a size of operation of the first type of operation;

determining, based on the size of operation, a third address for the first type of operation and storing the third address in the memory associated with the source device;

receiving a fourth request packet comprising the third address;

eliminating, in a header of the fourth request packet, the third address to form a fifth request packet; and sending the fifth request packet to the target device.

12. The method of claim 9, further comprising:

receiving a response packet in response to the third request packet; and matching, based on a tag field in the response packet, the response packet with the third request packet.

13. The method of claim 9, wherein the first type of operation comprises at least one of a read operation, a write operation, or a scan operation.

14. The method of claim 9, wherein the storing further comprises storing the first type of operation and the first address in a data structure in a content addressable memory (CAM) associated with the source device.

15. The method of claim 14, further comprising:

indexing the first type of operation in the data structure using a unique process identification (ID).

16. A transceiver for sending and receiving data on a communication channel, the transceiver configured to:

receiving a first request packet comprising a plurality of information fields, the plurality of information fields comprising a first type of operation to be performed on a memory device and a first address in the memory device;

storing the first type of operation and at least a portion of the first address in a memory associated with the transceiver;

receiving a second request packet comprising a first portion of a second address;

determining, based on the first type of operation and the first portion of the second address, a second portion of the second address;

determining, based on at least the first address, a size of operation of the first type of operation;

determining, based on the size of operation, a third address for the first type of operation and storing the third address in the memory associated with the transceiver;

receiving a third request packet without the third address; and adding, in a header of the third request packet, the third address to form a fourth request packet.

17. The transceiver of claim 16, wherein the communication channel comprises at least one of a bus, a switch, a network, a crossbar, a daisy chain, or an interconnect fabric.

18. The transceiver of claim 16, wherein the operations further comprise:

generating, in response to the second request packet and based on a tag field in the second request packet, a response packet; and sending the response packet to a source device.

19. The transceiver of claim 16, wherein the first type of operation comprises at least one of a read operation, a write operation, or a scan operation.

20. The transceiver of claim 16, wherein the storing further comprises storing the first type of operation and the first address in a data structure in a cache memory associated with the transceiver.

21. The transceiver of claim 20, wherein the operations further comprise:

indexing the first type of operation in the data structure using a unique process identification (ID).

* * * * *